United States Patent
Xie

(10) Patent No.: US 10,021,048 B2
(45) Date of Patent: Jul. 10, 2018

(54) METHOD, TERMINAL AND COMPUTER STORAGE MEDIUM FOR GROUP SENDING MESSAGE IN INSTANT COMMUNICATION

(71) Applicant: Tencent Technology (Shenzhen) Company Limited, Shenzhen, Guangdong (CN)

(72) Inventor: Dong Xie, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 326 days.

(21) Appl. No.: 14/696,590

(22) Filed: Apr. 27, 2015

(65) Prior Publication Data

US 2015/0256492 A1  Sep. 10, 2015

Related U.S. Application Data

(63) Continuation of application No. PCT/CN2013/090536, filed on Dec. 26, 2013.

(30) Foreign Application Priority Data

May 16, 2013 (CN) .......................... 2013 1 0182131

(51) Int. Cl.
  *G06F 15/16* (2006.01)
  *H04L 12/58* (2006.01)
  (Continued)

(52) U.S. Cl.
  CPC ......... *H04L 51/046* (2013.01); *G06Q 10/107* (2013.01); *H04L 65/403* (2013.01); *H04L 67/10* (2013.01)

(58) Field of Classification Search
  CPC ...... H04L 67/10; H04L 65/403; H04L 51/046
  (Continued)

(56) References Cited

U.S. PATENT DOCUMENTS

| 2002/0152402 | A1 | 10/2002 | Tov et al. |
| 2003/0079024 | A1 | 4/2003 | Hough et al. |
| 2010/0057754 | A1* | 3/2010 | Moudy ............... G06Q 20/382 |
| | | | 707/E17.044 |

FOREIGN PATENT DOCUMENTS

| CN | 1968442 A | * | 4/2007 |
| CN | 101217517 A | * | 7/2008 |

(Continued)

OTHER PUBLICATIONS

All About Windows Phone; 'MobileQQ'; Jun. 23, 2011; all pages.*

(Continued)

*Primary Examiner* — Glenford Madamba
(74) *Attorney, Agent, or Firm* — Tim Tingkang Xia, Esq.; Locke Lord LLP

(57) ABSTRACT

Provided is a method for group sending message in instant communication, including following steps: acquiring a request for group sending message, accessing a contact list, and then acquiring information of multiple contacts selected from said contact list; acquiring inputted message to be group sent; and sending said inputted message to a respective receiving terminal of each of said contacts, according to information of each of said contacts. By implementing the technical scheme of the present disclosure, the user's time in operating is reduced, the efficiency of group sending message is improved, especially when the method is applied in a mobile terminal, the duration time of the mobile terminal is prolonged, and the security of group sending message is improved. The disclosure also provides a terminal and a computer storage medium for group sending message in instant communication.

6 Claims, 5 Drawing Sheets

(51) Int. Cl.
*G06Q 10/10* (2012.01)
*H04L 29/06* (2006.01)
*H04L 29/08* (2006.01)

(58) Field of Classification Search
USPC .......................................................... 709/206
See application file for complete search history.

(56) References Cited

FOREIGN PATENT DOCUMENTS

| | | |
|---|---|---|
| CN | 101217517 A | 7/2008 |
| CN | 101272527 A | 9/2008 |
| CN | 102036181 A | 4/2011 |
| CN | 102065383 A | 5/2011 |
| CN | 102946587 A | 2/2013 |

OTHER PUBLICATIONS

International Search Report dated Mar. 27, 2014 in International Application No. PCT/CN2013/090536, filed Dec. 26, 2013.
Office Action issued by the State Intellectual Property Office of the Peoples Republic of China dated Jul. 4, 2017 for CN 2013101821311.
Search Report and Office Action issued by the State Intellectual Property Office of the Peoples Republic of China dated Feb. 24, 2018 for Chinese Application No. 201310182131.1.

\* cited by examiner

METHOD, TERMINAL AND COMPUTER STORAGE MEDIUM FOR GROUP SENDING MESSAGE IN INSTANT COMMUNICATION

This application is a continuation of International Application No. PCT/CN2013/090536, entitled "METHOD, TERMINAL AND COMPUTER STORAGE MEDIUM FOR GROUP SENDING MESSAGE IN INSTANT COMMUNICATION" filed on Dec. 26, 2013, which claims priority to Chinese patent application No. 201310182131.1, entitled "METHOD AND TERMINAL FOR GROUP SENDING MESSAGE IN INSTANT COMMUNICATION" filed on May 16, 2013, both of which are incorporated by reference in their entirety.

FIELD OF THE INVENTION

The present disclosure relates to the field of computer technology, and more particularly to a method, a device and a computer storage medium for group sending message in instant communication.

BACKGROUND OF THE INVENTION

Instant communication is an application for exchanging message instantly based on internet. Along with rapid development of network, more and more people use an instant communication tool for chatting and interacting so as to enrich their daily life.

The user using the instant communication tool often needs to send the same messages to multiple contacts, such as festival congratulations, event notifications or meeting invitations, and so on. The prior art method for group sending message in instant communication is that, when sending a same message to multiple contacts using the instant communication tool, normally the user sends said message to the contacts one by one, that is, selecting one contact at one time, editing the message and then sending it to said contact. However, the efficiency of group sending message in this way is very low, it is inconvenient for the user to operate and it is a waste of time. Alternatively, the user may send the same message to multiple contacts by means of establishing a chat group or a discussion group, however, the method herein needs to establish a chat group or a discussion group manually first, which is very complicated, and especially for those who don't have the ability to establish a chat group or a discussion group through the instant communication tool, said method is hard to realize. As a result, it is complicated to operate for the user to group send messages in instant communication by the conventional method; especially when the conventional method is applied in a mobile terminal, the user's time in operating is increased, and the duration time of a mobile terminal with limited power is shorten.

SUMMARY OF THE INVENTION

In view of the defects existing in the prior art mentioned above, in one aspect, the present disclosure provides a method for group sending message in instant communication, which can simplify the operation, so as to prolong the duration time of a mobile terminal:

A method for group sending message in instant communication, including following steps:

acquiring a request for group sending message by a terminal for group sending message, accessing a contact list, and then acquiring information of multiple contacts selected from said contact list;

acquiring a request for group sending message to a contact sub-group by said terminal, accessing a contact list of the contact sub-group, and then acquiring information of multiple contacts selected from the contact list of the contact sub-group;

acquiring inputted message to be group sent by said terminal; and sending said inputted message, by said terminal, to a respective receiving terminal of each of said contacts according to information of each of said contacts.

In another aspect, the present disclosure provides a terminal for group sending message in instant communication, including:

a contact information acquiring module, configured to acquire a request for group sending message, access a contact list, and acquire information of multiple contacts selected from said contact list; and further configured to acquire a request for group sending message to a contact sub-group, access a contact list of the contact sub-group, and then acquire information of multiple contacts selected from the contact list of the contact sub-group;

a group sent message input module, configured to acquire inputted message to be group sent;

a data transceiver module, configured to send said inputted message to a respective receiving terminal of each of said contacts, according to information of each of said contacts.

In another aspect, the present disclosure provides a computer storage medium for group sending message in instant communication, including computer executable instructions, said computer executable instructions are configured to execute a method for group sending message in instant communication, wherein, the method includes:

acquiring a request for group sending message by a terminal for group sending message, accessing a contact list, and then acquiring information of multiple contacts selected from said contact list;

acquiring a request for group sending message to a contact sub-group by said terminal, accessing a contact list of the contact sub-group, and then acquiring information of multiple contacts selected from the contact list of the contact sub-group;

acquiring inputted message to be group sent by said terminal; and sending said inputted message, by said terminal, to a respective receiving terminal of each of said contacts according to information of each of said contacts.

According to the method, the terminal and the computer storage medium for group sending message in instant communication of the present disclosure, the terminal for group sending message acquires the message to be group sent and information of multiple contacts at one time, and sends said message to a respective receiving terminal of each of said contacts. As compared to the prior art method (that is, selecting one contact at one time, and editing the message and then sending it to said contact), the method of the present disclosure reduces the user's time in operating, improves the efficiency of group sending message, especially when it is applied in a mobile terminal, the method prolongs the duration time of the mobile terminal. Moreover, the terminal for group sending message forwards the group sent message according to information of each contact, thereby each of the multiple contacts receiving the message can't know other receivers of the group sent message, which is distinguished from the chat group or the discussion group of the prior art in that, the message is forwarded to each of the receivers independently, the user of a receiving terminal can't acknowledge other users who receive the group sent message, which improves the security for group sending message.

DETAILED DESCRIPTION OF THE EMBODIMENTS

In order to make the present disclosure easy to understand, it will be described in further details with the accompanying drawings and the following embodiments. It should be understood that the present disclosure may be implemented in various manners, the specific embodiments described herein are merely examples to illustrate the disclosure, not to limit the present disclosure. Oppositely, the purpose of providing the specific embodiments is to make the present disclosure to be understood more clearly and comprehensively.

Figure 1:
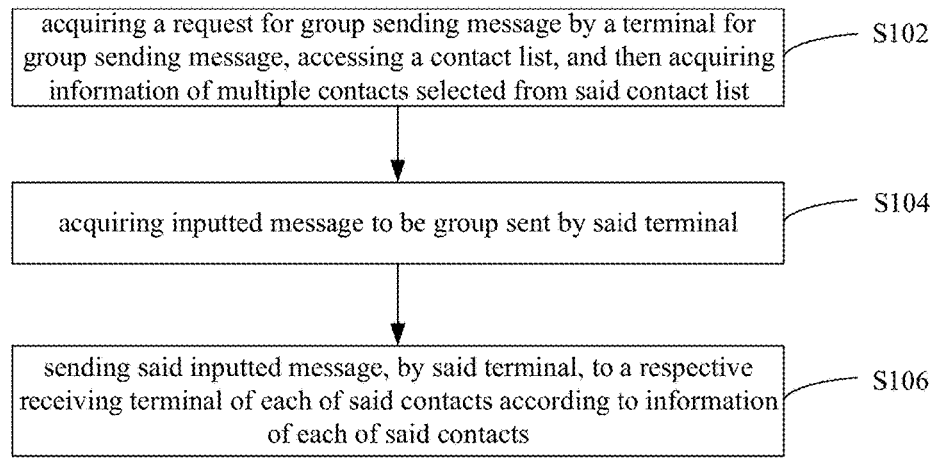
FIG. 1 is a schematic flow diagram illustrating a method for group sending message in instant communication according to one embodiment of the present invention.

In one embodiment as shown in FIG. 1, a method is provided for group sending message in instant communication, which includes following steps:

Step 102: acquiring a request for group sending message by a terminal for group sending message, accessing a contact list, and then acquiring information of multiple contacts selected from said contact list.

Figure 2A:
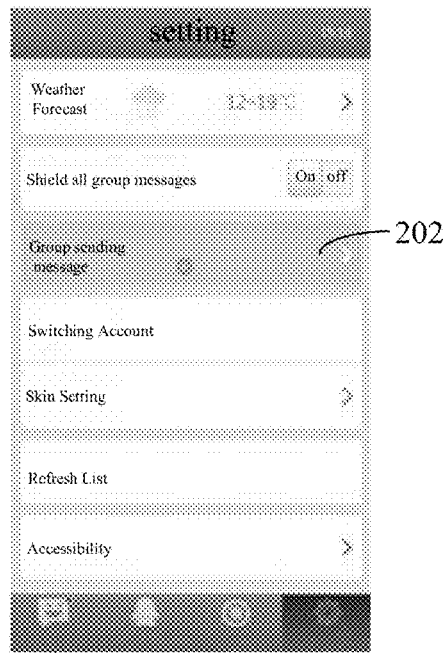
FIG. 2A is a schematic diagram illustrating the operating interface for acquiring a request for group sending message in the method as shown in FIG. 1.
Figure 2B:
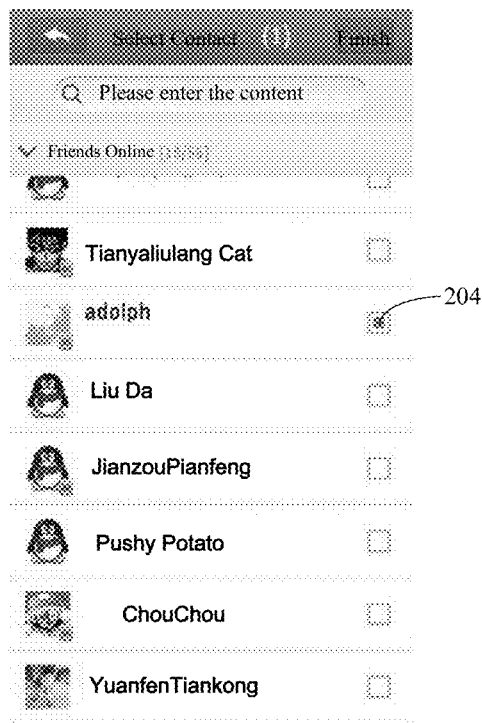
FIG. 2B is a schematic diagram illustrating the operating interface for acquiring information of multiple contacts selected from the contact list in the method as shown in FIG. 1.

As shown in FIG. 2A, a push-button icon of "group sending message" 202 can be added in the setting interface of the terminal for group sending message in instant communication, and by means of clicking said push-button icon, the step of acquiring the request for group sending message of the terminal for group sending message can be achieved, after having acquired the request for group sending message, the terminal goes into a group sending message mode, then the contact list will be shown in the interface of the terminal, which is illustrated in FIG. 2B.

After the terminal for group sending message goes into a contact selecting interface, the first thing need to do is to select multiple contacts to whom the message is to be group sent. As shown in FIG. 2B, the terminal's selecting multiple contacts can be realized by setting a respective radio button 204 next to each contact button so as to enable selecting the contact corresponding to a contact button by clicking the respective radio button 204. Having selected the contact, the terminal for group sending message acquires the information thereof, and the information of said contact is a contact identification capable of uniquely identifying the contact, such as a contact number, a contact e-mail address, a contact user name, and so on.

Step 104: acquiring inputted message to be group sent by said terminal.

Figure 2C:
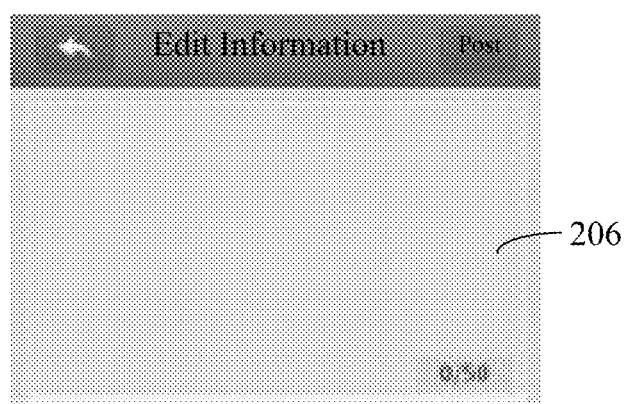
FIG. 2C is a schematic diagram illustrating the operating interface for acquiring inputted message to be group sent in the method as shown in FIG. 1.

The terminal for group sending message further acquires inputted message to be group sent after acquiring the information of multiple contacts selected from the contact list. The message to be group sent not only may contain text information but also may contain information in form of rich media file, such as a voice, a picture, and so on. As shown in FIG. 2B, the user clicks "complete" icon button 206 after having selected contacts, then the terminal for group sending message goes into an interface of "editing information" 206, which is shown in FIG. 2C. The inputted message to be sent in the interface of "editing information" may be limited to texts containing no more than 50 characters.

Step 106: sending said inputted message, by said terminal, to a respective receiving terminal of each of said contacts according to information of each of said contacts.

The terminal for group sending message can save information of multiple contacts in a queue after having acquired the information of multiple contacts, and forward the inputted message to a respective receiving terminal of each of said contacts according to the information of the contacts in the queue.

In this embodiment, the terminal for group sending message acquires the message to be group sent and information of multiple contacts at one time, and sends said message to a respective receiving terminal of each of said contacts. As compared to the prior art method (that is, selecting one contact at one time, and editing the message and then sending it to said contact), the method of the present disclosure reduces the user's time in operating, improves the efficiency of group sending message, especially when it is applied in a mobile terminal, the method prolongs the duration time of the mobile terminal. Moreover, the terminal for group sending message forwards the group sent message according to information of each contact, thereby each of the multiple contacts receiving the message can't know other receivers of the group sent message, which is distinguished from the chat group or the discussion group of the prior art in that, the message is forwarded to each of the receivers independently, the user of a receiving terminal can't acknowledge other users who receive the group sent message, which improves the security for group sending message.

Figure 3:
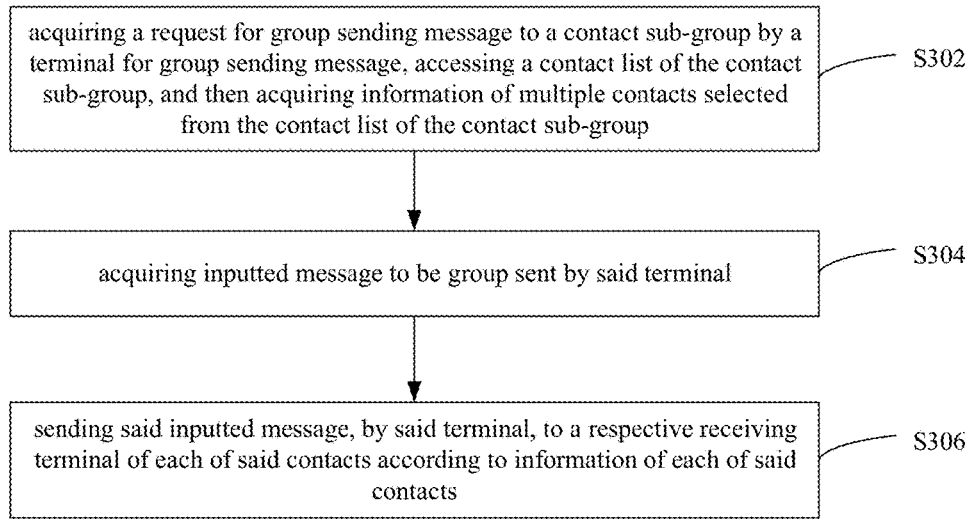
FIG. 3 is a schematic flow diagram illustrating a method for group sending message in instant communication according to another embodiment of the present invention.

In another embodiment as shown in FIG. 3, a method is provided for group sending message in instant communication, which includes following steps:

Step 302: acquiring a request for group sending message to a contact sub-group by a terminal for group sending message, accessing a contact list of the contact sub-group, and then acquiring information of multiple contacts selected from the contact list of the contact sub-group.

The terminal for group sending message acquires a request for group sending message to a contact sub-group so as to forward the group sent message to members of different sub-groups, such as a colleague sub-group, a classmate sub-group, and so on. Having acquired a request for group sending message to a contact sub-group, such as a request for group sending message to the colleague sub-group, correspondingly the terminal for group sending message goes into a contact selecting interface of the colleague sub-group.

The user selects multiple contacts after the terminal for group sending message goes into the contact selecting interface of the contact sub-group. The terminal for group sending message correspondingly acquires information of said contacts. And the information of a contact may contain a contact identification, a time for timed sending corresponding to the contact, and so on.

Step 304: acquiring inputted message to be group sent by said terminal.

Step 306: sending said inputted message, by said terminal, to a respective receiving terminal of each of said contacts according to information of each of said contacts.

In this embodiment, selecting and group sending message to contacts included in a certain contact sub-group can be achieved by means of acquiring a request for group sending message to a contact sub-group, which can further simplify user's operation, as compared to selecting contacts for group sending message from all of the contacts, especially when the method is applied in a mobile terminal, the duration time of the mobile terminal is further prolonged.

Figure 4:
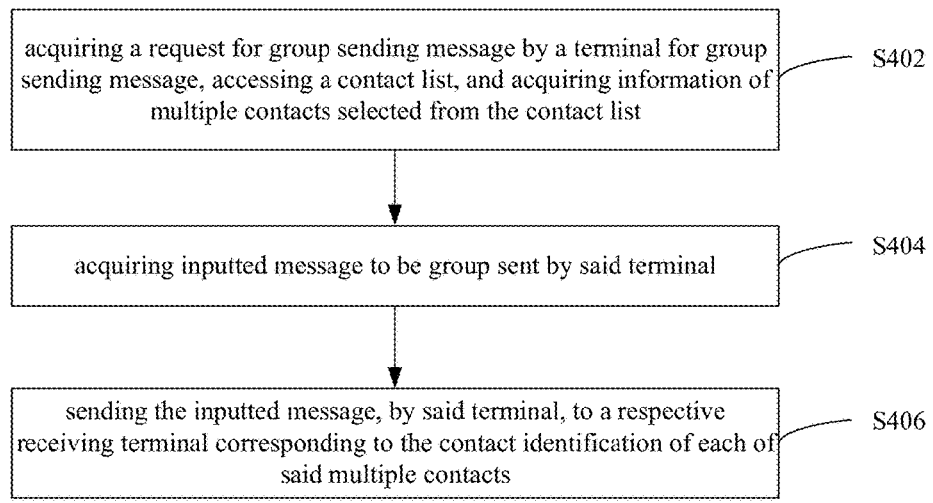
FIG. 4 is a schematic flow diagram illustrating a method for group sending message in instant communication according to another embodiment of the present invention.

In another embodiment as shown in FIG. 4, a method is provided for group sending message in instant communication, which includes following steps:

Step 402: acquiring a request for group sending message by a terminal for group sending message, accessing a contact list, and acquiring information of multiple contacts selected from the contact list.

Particularly, the information of each of the multiple contacts is a contact identification.

Step 404: acquiring inputted message to be group sent by said terminal.

Step 406: sending the inputted message, by said terminal, to a respective receiving terminal corresponding to the contact identification of each of said multiple contacts.

Having acquired contact identifications of the multiple contacts, the terminal for group sending message saves these contact identifications in a queue, then sends said inputted message to a respective receiving terminal corresponding to the contact identification of each of said multiple contacts, according to said contact identifications in the queue.

In this embodiment, the terminal for group sending message forwards group sent message according to each of the contact identifications, thereby each of the multiple contacts receiving the message can't know other receivers of the group sent message, which is distinguished from the chat group or the discussion group of the prior art in that, the message is forwarded to each of the receivers independently, the user of a receiving terminal can't acknowledge other users who receive the group sent message, which improves the security for group sending message.

Figure 5:
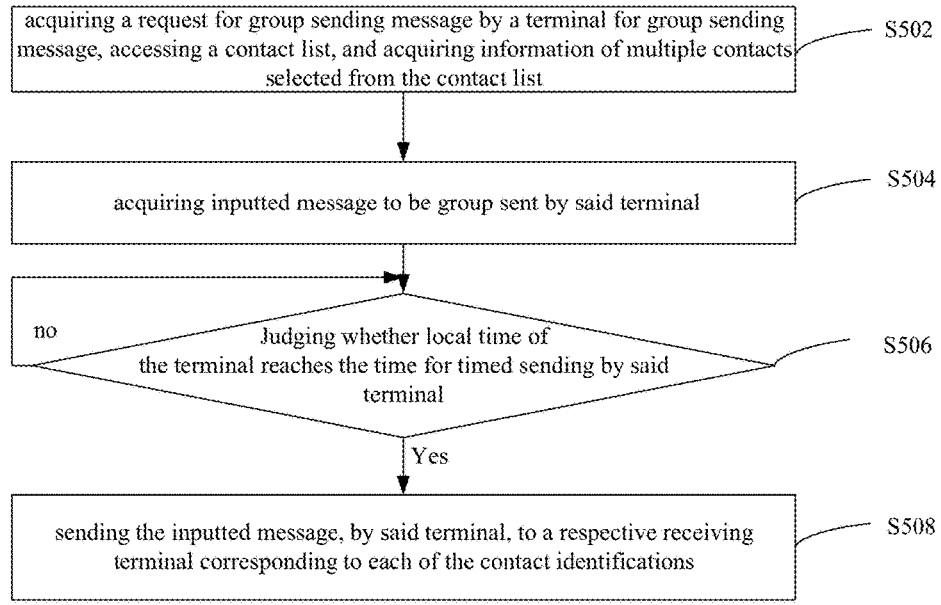
FIG. 5 is a schematic flow diagram illustrating a method for group sending message in instant communication according to another embodiment of the present invention.

In another embodiment as shown in FIG. 5, a method is provided for group sending message in instant communication, which includes following steps:

Step 502: acquiring a request for group sending message by a terminal for group sending message, accessing a contact list, and acquiring information of multiple contacts selected from the contact list.

Particularly, the information of each of the multiple contacts contains a contact identification and a time for timed sending corresponding to the contact. The time for timed sending corresponding to each of the multiple contacts may be same or different. In this embodiment, the time for timed sending corresponding to each contact selected can be set in the contact selecting interface.

Step 504: acquiring inputted message to be group sent by said terminal.

Step 506: judging whether local time of the terminal reaches the time for timed sending by said terminal, if it does, then turning to the step 508.

Step 508, sending the inputted message, by said terminal, to a respective receiving terminal corresponding to each of the contact identifications.

In this embodiment, before sending the message, the terminal first judges whether the local time of the terminal for group sending message reaches the time for timed sending, only when the current local time of the terminal for group sending message is judged as the time for timed sending, the terminal forwards the group sent message, thereby the inputted message can be sent at a preset time.

Particularly, the method mentioned above for group sending message in instant communication is applied in mobile QQ, which is an instant communication application, for example, developed by Tencent, installed in an intelligent mobile terminal.

Figure 6:
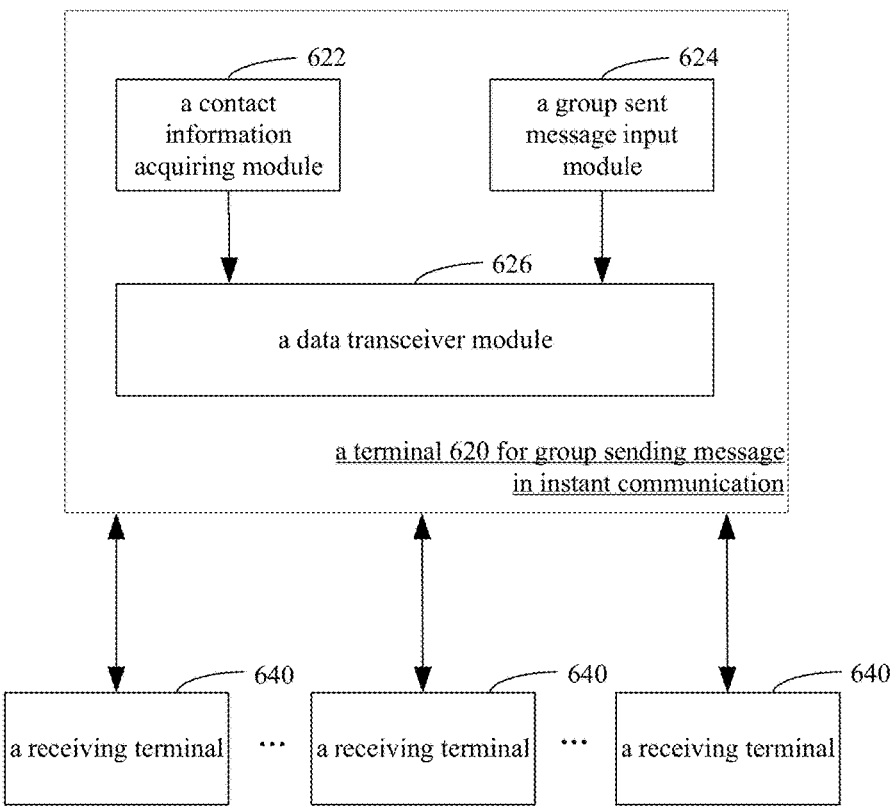
FIG. 6 is a schematic diagram illustrating the structure and application scenario of a terminal for group sending message in instant communication according to one embodiment of the present invention.

In one embodiment as shown in FIG. 6, a terminal 620 is provided for group sending message in instant communication, the terminal 620 includes:

a contact information acquiring module 622, configured to acquire a request for group sending message, access a contact list, and acquire information of multiple contacts selected from said contact list;

a group sent message input module 624, configured to acquire inputted message to be group sent;

a data transceiver module 626, configured to send said inputted message to a respective receiving terminal 640 of each of said contacts, according to information of each of said contacts.

In one embodiment, the contact information acquiring module 622 is also configured to acquire a request for group sending message to a contact sub-group, access a contact list of the contact sub-group, and then acquire information of multiple contacts selected from the contact list of the contact sub-group.

In one embodiment, the information of a contact is a contact identification. The data transceiver module 626 is configured to send the inputted message to be group sent to a respective receiving terminal 640 corresponding to the contact identification of each of said multiple contacts.

Figure 7:
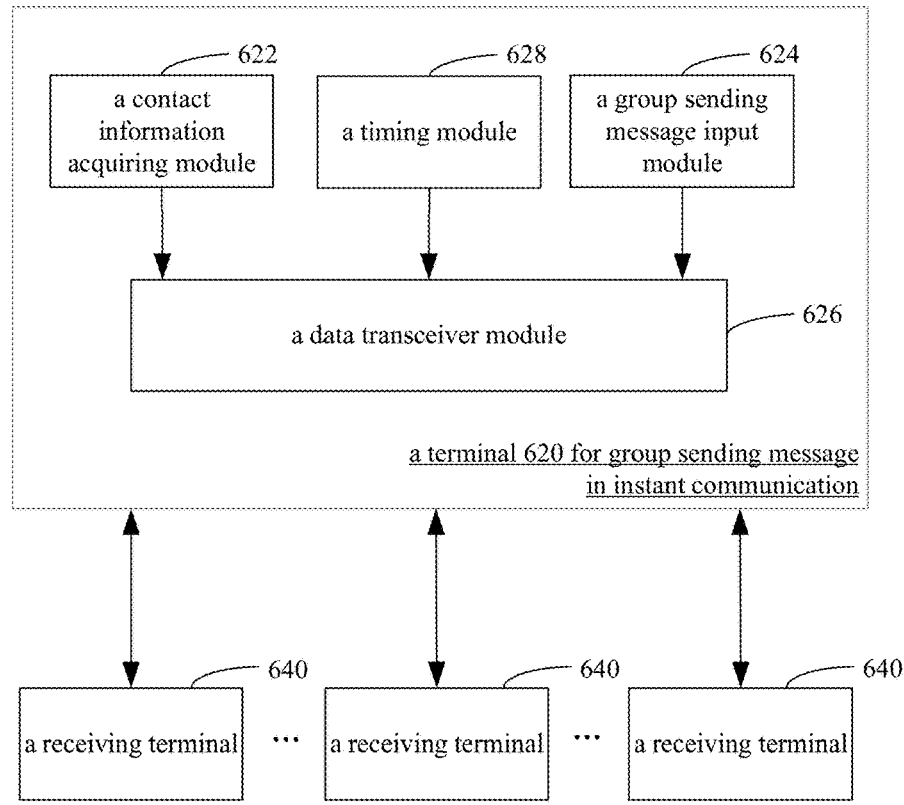
FIG. 7 is a schematic diagram illustrating the structure and application scenario of a terminal for group sending message in instant communication according to another embodiment of the present invention.

In another embodiment as shown in FIG. 7, a terminal 620 is provided for group sending message in instant communication, the terminal 620 includes:

a contact information acquiring module 622, configured to acquire a request for group sending message, access contact list, and acquire information of multiple contacts selected from contact list;

Particularly, the information of each of the multiple contacts contains a contact identification and a time for timed sending corresponding to the contact.

a group sent message input module 624, configured to acquire inputted message to be group sent;

a timing module 628, configured to judge whether the local time of the terminal 620 for group sending message reaches the time for timed sending; and a data transceiver module 626, configured to send said inputted message to a respective receiving terminal 640 corresponding to the contact identification of each of said multiple contacts, when the timing module 628 judges that the local time of the terminal for group sending message reaches the time for timed sending.

Preferably, the terminal 620 for group sending message in instant communication mentioned above is a mobile phone, and mobile QQ, which is an instant communication application, for example, developed by Tencent, is installed in said mobile phone.

It should be understood by those skilled in the art that all or part of the processes of preferred embodiments disclosed above may be realized through relevant hardware commanded by computer program instructions. Said program may be saved in a computer readable storage medium, and said program may include the processes of the preferred embodiments mentioned above when it is executed. Wherein, said storage medium may be a diskette, optical disk, ROM (Read-Only Memory) or RAM (Random Access Memory), and so on.

Figure 8:
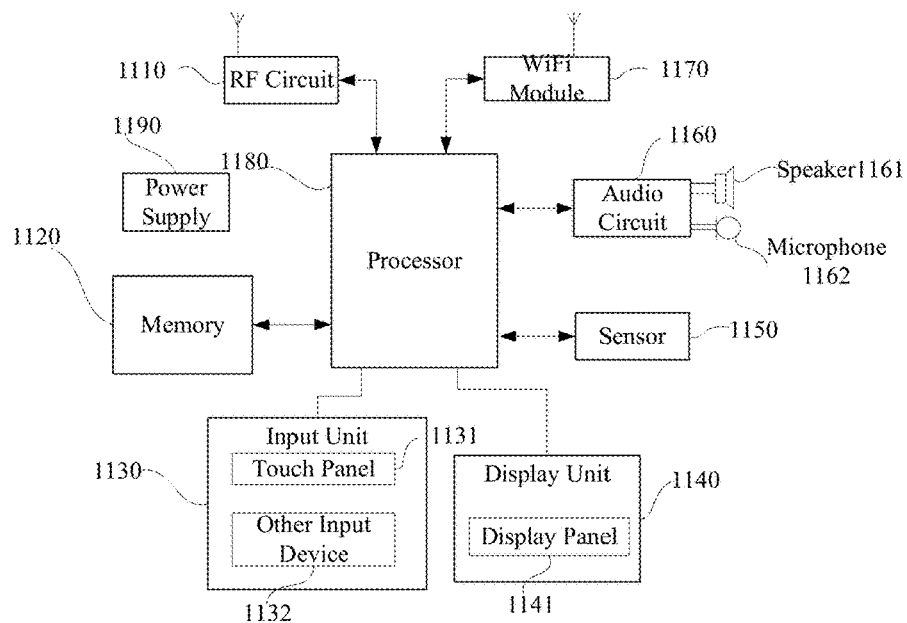
FIG. 8 is a structure diagram illustrating a terminal for group sending message in instant communication according to one embodiment of the present invention.

In another embodiment as shown in FIG. 8, a terminal for group sending message in instant communication is provided, in order to illustrate said terminal more clearly, what is shown in FIG. 8 is a part of said terminal relevant to this embodiment of the present invention, for the technical details which are uncovered, please refer to embodiments involving methods of the present invention. Said terminal may be any terminal devices such as a mobile phone, tablet PC, PDA (personal digital assistant), POS (point of sales), on-board computer, and so on. Taking a mobile phone, a mobile terminal, as an example:

FIG. 8 is a structure diagram illustrating a portion of mobile phone relevant to the terminal for group sending message in instant communication according to one embodiment of the present invention. As shown in FIG. 8, the mobile phone includes: RF (Radio Frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, a power supply 1190 and so on. It should be understood by those skilled in the art that, the mobile phone is not limited by the structure of the mobile phone shown in FIG. 8, but may include more or less components, or any combinations thereof, or the components may be arranged in different layouts.

Various components of the mobile phone will be described in more details with reference to the FIG. 8:

RF circuit 1110 is used to send and receive signals in process of sending and receiving messages or making phone calls, preferably, after receiving downlink information from a base station, the RF circuit 1110 sends said downlink information to the processor 1180 for processing; on the other hand, the designed uplink data is sent to the base station. Usually, the RF circuit includes but is not limited to, an antenna circuitry, at least one amplifier, a transceiver, a coupler, a low noise amplifier (LNA), a duplexer, and so on. Moreover, the RF circuit 1110 may also communicate with other devices through wireless communication and network. The wireless communication mentioned above may use any communication or agreement which includes but is not limited to GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), and son on.

The memory 1120 is configured to save software programs and modules; the processor 1180 executes various functions of the mobile phone and data processing applications by running said software programs and modules saved in the memory 1120. Memory 1120 may mainly include a program storage area and a data storage area, wherein, said program storage area may store an operating system program, application program required by at least one function (such as sound playback, image playback, etc.), and so on; said data storage area may store data created according to the usage of the mobile phone (such as audio data, phone book, etc.). In addition, said memory 1120 may include a high-speed random access memory, and may further include a non-volatile memory, such as at least one of disk storage devices, flash memory devices and other volatile solid state memory devices.

Said input unit 1130 is configured to receive numbers or character information entered by the user, and for generating key signal inputs relevant to user settings and function control of the mobile phone 1100. Particularly, said input unit 1130 may include a touch panel 1131 and other input devices 1132. Said touch panel 1131, also known as a touch screen, is configured to collect the user's touch operations thereon or nearby (for example, a user operates on or near said touch panel 1131 using a finger, a stylus, and any other suitable objects or attachments), and driving corresponding connecting devices based on a preset program. Preferably, said touch panel 1131 may include a touch detection unit and a touch controller. Wherein the touch detection unit detects the touch position of the user, and detects signals generated by the touch operation, and then the signals are sent to a touch controller; the touch controller receives the touch information from said touch detection unit and converts said touch information into contact coordinates, and then sends said contact coordinates to said processor 1180, said touch controller is also able to receive instructions from said processor 1180 and execute said instructions. Wherein, said touch panel 1131 may be realized in various manners such as resistance-type, capacitance-type, infrared-ray and surface acoustic wave. In addition to said touch panel 1131, said input unit 1130 may further include other input device 1132. Particularly, said other input device 1132 includes but is not limited to one or more of a physical keyboard, function keys (such as volume control buttons, switch buttons, etc.), a trackball, a mouse and an operating lever.

Said display unit 1140 is configured to display the information entered by a user or information provided to a user as well as various menus of the mobile phone. Said display unit 1140 may include a display panel 1141, particularly, said display panel 1141 may be configured by a LCD (Liquid Crystal Display), an OLED (Organic Light-Emitting Diode) or other forms of display panel. Preferably, said touch panel 1131 covers said display panel 1141, after detecting a touch operation thereon or nearby, said touch panel 1131 generates a touch signal and sends said touch signal to said processor 1180 so as to determine the type of touch event, and then said processor 1180 provides a corresponding visual output on said display panel 1141 according to the type of touch event. Although in the embodiment shown in FIG. 8, said touch panel 1131 and said display panel 1141 are embodied as two separate components to achieve input and output functions of the mobile phone, in some embodiments, said touch panel 1131 and said display panel 1141 may be integrated to achieve input and output functions of the mobile phone.

The mobile phone 1100 may further include at least one sensor 1150, such as an optical sensor, motion sensor and other types of sensors. Particularly, the optical sensor may include an ambient light sensor and a proximity sensor, wherein, the ambient light sensor can adjust the brightness of the display panel 1141 according to the brightness of ambient light, and the proximity sensor can close said display panel 1141 and/or backlight when the mobile phone moves to the ear. As a motion sensor, accelerometer sensor can detect the value of acceleration in each direction (typically three axis), and can detect the magnitude and direction of gravity when it is in static state, and further can be used for applications involving identifying the phone posture (such as horizontal and vertical screen switching, related games, magnetometer calibration posture), vibration recognition related functions (e.g. pedometer, percussion), etc.; as for other sensors which may be equipped in the mobile phone, such as a gyroscope, barometer, hygrometer, thermometer, infrared sensor and so on, they will not be described here in details.

Said audio circuit 1160, speaker 1161, microphone 1162 can provide an audio interface between the user and the mobile phone. Said audio circuit 1160 can receive audio data and convert the audio data into electrical signals, and then transmit said electrical signals to said speaker 1161. Said speaker 1161 converts said electrical signals to audio signals to be output; on the other hand, said microphone 1162 converts sound signals collected to electrical signals, and after receiving said electrical signals the audio circuit 1160 converts said electrical signals to audio data, and outputs said audio data to the processor 1180 for processing, and then said audio data are sent to another phone via said RF circuit 1110, or sent to said memory 1120 for further processing.

Wi-Fi belongs to a short-range wireless transmission technology, and a mobile phone can help the user to send and receive email, browse the web and access streaming media, and so on via the Wi-Fi module 1170, which provides wireless broadband Internet access to the user. Although FIG. 8 shows a Wi-Fi module 1170, but it should be understood that it is not an essential part of said mobile phone 1100, but may be omitted as needed within the scope of unchanging the essence of the present disclosure.

Said processor 1180 is the control center of the mobile phone, configured to connect each part of the mobile phone through a variety of interfaces and connections, and executing various functions of the mobile phone and data processing to monitor the overall of the mobile phone by running or executing software programs and/or modules stored in the memory 1120 and calling in data stored in the memory 1120. Preferably, said processor 1180 may include one or more processing units; preferably, an application processor and a modem processor may be integrated in said processor 1180, wherein, said application processor mainly processes the operating system, user interface and applications, and said modem processor mainly deals with wireless communications. It should be understood that said modem processor mentioned above may be not integrated into said processor.

Said mobile phone 1100 further includes a power supply 1190 (such as a battery), configured to supply the power to various parts, preferably, said power supply system is logically connected to said processor 1180 via the power management system, thereby realizing functions such as charging management, discharging management, power consumption management, and so on via the power management system.

Although it is not shown, said phone 1100 may further include a camera, Bluetooth module, etc., which are not discussed in details here.

In one embodiment of the present disclosure, the processor 1180 included in the terminal further has following functions:

acquiring a request for group sending message, accessing contact list, acquiring information of multiple contacts selected from contact list; acquiring inputted message to be group sent, and sending inputted message to a respective receiving terminal of each of said contacts.

In one embodiment, the processor 1180 included in the terminal further has following functions:

acquiring a request for group sending message to a contact sub-group, accessing a contact list of the contact sub-group, and then acquiring information of multiple contacts selected from the contact list of the contact sub-group.

In one embodiment, the processor 1180 included in the terminal further has following functions:

acquiring a request for group sending message, accessing a contact list, acquiring multiple contact identifications selected from the contact list; acquiring inputted message to be group sent; sending said inputted message to a respective receiving terminal corresponding to each of the contact identifications.

In one embodiment, the processor 1180 included in the terminal further has following functions:

acquiring a request for group sending message, accessing a contact list, acquiring multiple contact identifications selected from the contact list and time for timed sending corresponding to each of the selected contacts, acquiring inputted message to be group sent, judging whether the local time of the terminal reaches time for timed sending, if it does, sending the inputted message to a respective receiving terminal corresponding to each of the contact identifications.

It should be understood by those skilled in the art that what described above are preferred embodiments of the present disclosure. Various modifications and replacements may be made therein without departing from the theory of the present disclosure, which should also be seen in the scope of the present disclosure.

What is claimed is:

1. A method for group sending message in instant communication, comprising:

acquiring a request for a group sending message by a processor of a terminal for group sending of a group message by clicking an icon of group sending message in a user interface of said terminal such that said terminal is in a group sending message mode, accessing a first contact list, and then acquiring information of multiple contacts selected from said contact list by said processor;

acquiring a request for sending the group sending message to a contact sub-group by said processor terminal, accessing a second contact list of the contact sub-group, and then acquiring information of multiple contacts selected from the second contact list of the contact sub-group by said processor, wherein information of each of the multiple contacts comprises a contact identification;

acquiring inputted message to be group sent by said processor; and sending independently said inputted message, by said processor, to a respective receiving terminal of each of said contacts according to information of each of said contacts by sending said inputted message to a respective receiving terminal corresponding to each of the contact identifications preventing a contact of the respective receiving terminal from acknowledging other contacts who receive said inputted message.

2. The method for group sending message in instant communication according to claim 1, wherein, information of each of the multiple contacts comprises a contact identification and a time for timed sending corresponding to said contact; said step of sending said inputted message, by said processor, to a respective receiving terminal of each of said contacts according to information of each of said contacts comprises:

when a local time reaches said time for timed sending, sending said inputted message, by said processor, to a respective receiving terminal corresponding to each of the contact identifications.

3. A terminal for group sending message in instant communication, comprising: a processor and a memory having software programs stored therein, said processor being configured to execute the following steps when the software programs are executed by said processor:

acquiring a request for a group sending message by clicking an icon of group sending message in a user interface of said terminal such that said terminal is in a group sending message mode, accessing a first contact list, and then acquiring information of multiple contacts selected from said contact list;

acquiring a request for generating a request for sending the group sending message to a contact sub-group, access a second contact list of the contact sub-group, and then acquiring information of multiple contacts selected from the contact list of the contact sub-group, wherein information of each of the multiple contacts comprises a contact identification;

acquiring inputted message to be group sent; and sending independently said inputted message, by said processor terminal, to a respective receiving terminal of each of said contacts, according to information of each of said contacts by sending said inputted message to a respective receiving terminal corresponding to each of the contact identifications preventing a contact of the respective receiving terminal from acknowledging other contacts who receive said inputted message.

4. The terminal for group sending message in instant communication according to claim 3, wherein, information of each of the multiple contacts comprises a contact identification and a time for timed sending corresponding to said contact; and said processor is further configured to judge whether a local time of the terminal reaches said time for timed sending; and, if the local time reaches said time for timed sending, send said inputted message to a respective receiving terminal corresponding to each of the contact identifications.

5. A non-transitory computer readable storage medium for storing executable instructions, wherein said computer executable instructions are configured to execute a method for group sending message in instant communication by a processor of a terminal, wherein the method comprises:

acquiring a request for a group sending message by said processor of a terminal for group sending of a group message by clicking an icon of group sending message in a user interface of said terminal such that said terminal is in a group sending message mode, accessing a first contact list, and then acquiring information of multiple contacts selected from said contact list, by said processor;

acquiring a request for generating a request for sending the group sending message to a contact sub-group by said processor, accessing a second contact list of the contact sub-group, and then acquiring information of multiple contacts selected from the contact list of the contact sub-group by the processor, wherein information of each of the multiple contacts comprises a contact identification;

acquiring inputted message to be group sent by said processor; and sending independently said inputted message, by said processor terminal, to a respective receiving terminal of each of said contacts according to information of each of said contacts by sending said inputted message to a respective receiving terminal corresponding to each of the contact identifications preventing a contact of the respective receiving terminal from acknowledging other contacts who receive said inputted message.

6. The non-transitory computer readable storage medium according to claim 5, wherein, information of each of the multiple contacts comprises a contact identification and a time for timed sending corresponding to said contact; said step of sending said inputted message, by said processor, to a respective receiving terminal of each of said contacts according to information of each of said contacts comprises:

when a local time reaches said time for timed sending, sending said inputted message, by said terminal, to a respective receiving terminal corresponding to each of the contact identifications.

* * * * *